United States Patent
Park et al.

(10) Patent No.: US 9,740,043 B2
(45) Date of Patent: Aug. 22, 2017

(54) LIQUID CRYSTAL DISPLAY DEVICE WITH ANTISTATIC POLARIZING LAYER AND METHOD OF MANUFACTURING THE SAME

(71) Applicant: LG Display Co., Ltd., Seoul (KR)

(72) Inventors: HyeJeong Park, Jeonju-si (KR); YoonJung Eo, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 155 days.

(21) Appl. No.: 14/532,708

(22) Filed: Nov. 4, 2014

(65) Prior Publication Data

US 2015/0124186 A1 May 7, 2015

(30) Foreign Application Priority Data

Nov. 6, 2013 (KR) ........................ 10-2013-0134382

(51) Int. Cl.
*G02F 1/1335* (2006.01)
*G02F 1/1343* (2006.01)
*G02F 1/1339* (2006.01)
*G02F 1/1362* (2006.01)

(52) U.S. Cl.
CPC .. *G02F 1/133528* (2013.01); *G02F 1/134363* (2013.01); *G02F 2001/136222* (2013.01); *G02F 2202/22* (2013.01); *G02F 2202/36* (2013.01)

(58) Field of Classification Search
CPC ......... G02F 1/133528; G02F 1/134363; G02F 2202/36; G02F 2202/22; G02F 2001/136222
See application file for complete search history.

(56) References Cited

U.S. PATENT DOCUMENTS

| 8,253,870 B2 | 8/2012 | Qian et al. | |
| 8,390,580 B2* | 3/2013 | Jiang | G06F 3/0414 |
| | | | 345/173 |
| 2007/0003711 A1* | 1/2007 | Hwang | C09K 19/52 |
| | | | 428/1.31 |
| 2008/0170184 A1* | 7/2008 | Byun | B29D 11/0074 |
| | | | 349/97 |
| 2008/0198453 A1* | 8/2008 | LaFontaine | G02B 5/3075 |
| | | | 359/485.01 |
| 2011/0292311 A1 | 12/2011 | Qian et al. | |

FOREIGN PATENT DOCUMENTS

| CN | 1892267 A | 1/2007 |
| CN | 101988973 A | 10/2010 |
| CN | 101988973 A | 3/2011 |
| KR | 10-2011-0089612 A | 8/2011 |

OTHER PUBLICATIONS

Office Action for Chinese Patent Application No. CN 201410613062.X, Jan. 25, 2017, 15 Pages.

* cited by examiner

*Primary Examiner* — Tracie Y Green
(74) *Attorney, Agent, or Firm* — Fenwick & West LLP

(57) ABSTRACT

Disclosed is a liquid crystal display device and a method of manufacturing the same. The liquid crystal display device includes first and second substrates, a liquid crystal layer between the first and second substrates, and a first polarizing layer on the first substrate, wherein the first polarizing layer includes a plurality of carbon nanotubes aligned in a first direction.

10 Claims, 5 Drawing Sheets

LIQUID CRYSTAL DISPLAY DEVICE WITH ANTISTATIC POLARIZING LAYER AND METHOD OF MANUFACTURING THE SAME

CROSS REFERENCE TO RELATED APPLICATIONS

This application claims the benefit of Korean Patent Application No. 10-2013-0134382 filed on Nov. 6, 2013, which is hereby incorporated by reference as if fully set forth herein.

BACKGROUND

Field of the Disclosure

Embodiments of the present invention relate to a liquid crystal display (LCD) device, and more particularly, to a polarizing plate formed on a lower substrate or an upper substrate of an LCD device.

Discussion of the Related Art

A liquid crystal display (LCD) device is advantageous in that it enables low power consumption and portability. Due to these advantages, the LCD device is widely used in various fields, for example, notebook computer, monitor, spacecraft, aircraft, and etc.

The LCD device may include a lower substrate, an upper substrate, and a liquid crystal layer between the lower and upper substrates. As an electric field is applied to the LCD device, liquid crystal molecules of the liquid crystal layer are aligned so that a light transmittance is controlled, and thus an image is displayed on the LCD device.

Hereinafter, a related art LCD device will be described with reference to the accompanying drawings.

Figure 1:
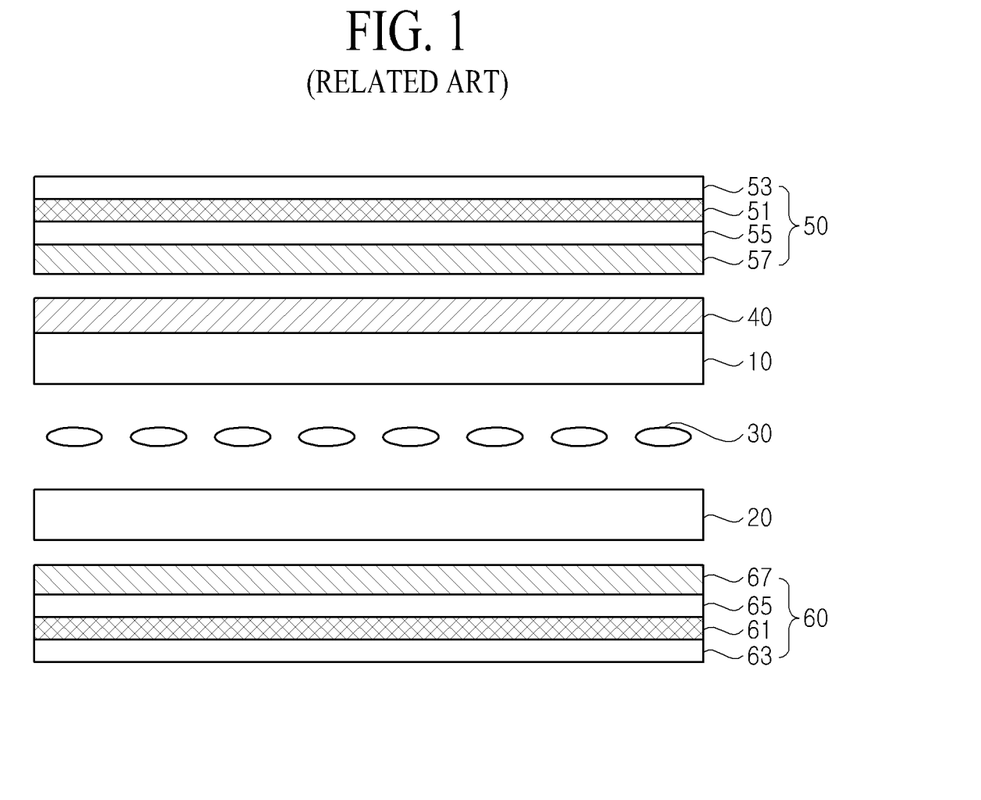
FIG. 1 is a cross sectional view illustrating a related art LCD device.

FIG. 1 is a cross sectional view illustrating the related art LCD device.

As shown in FIG. 1, the related art LCD device may include an upper substrate 10, a lower substrate 20, a liquid crystal layer 30, an antistatic layer (static-electricity prevention layer) 40, an upper polarizing plate 50, and a lower polarizing plate 60.

Although not shown, a light shielding layer for prevention of light leakage is provided on one surface of the upper substrate 10, and more particularly, a lower surface of the upper substrate 10 facing the lower substrate 20. Also, a color filter layer for a color realization is provided in a region between each light shielding layer.

Although not shown, a thin film transistor functioning as a switching device is formed on one surface of the lower substrate 20, and more particularly, an upper surface of the lower substrate 20 facing the upper substrate 10. Also, a pixel electrode is formed and connected with the thin film transistor, and a common electrode is arranged in parallel to the pixel electrode, wherein both the pixel and common electrodes are provided to form an electric field.

The liquid crystal layer 30 is formed between the upper substrate 10 and the lower substrate 20, and an alignment direction of the liquid crystal layer 30 is controlled by the electric field formed through the use of pixel and common electrodes.

The antistatic layer (static-electricity prevention layer) 40 is formed on an upper surface of the upper substrate 10. The antistatic layer 40 is provided to prevent static electricity from being generated for a manufacturing process. In more detail, as described above, the light shielding layer and the color filter layer are formed on the lower surface of the upper substrate 10. For a process of forming these layers such as the light shielding layer and the color filter layer, the static electricity may be generated on the upper substrate 10 due to a contact with a plurality of processing and transferring apparatuses. In order to remove the static electricity, the antistatic layer 40 is formed of a conductive material, for example, Indium Tin Oxide (ITO), on the upper surface of the upper substrate 10.

The upper polarizing plate 50 is formed on an upper surface of the antistatic layer 40. The upper polarizing plate 50 may include an upper polarizer 51 having a predetermined optical axis, a first upper protection film 53 formed on one surface of the upper polarizer 51, a second upper protection film 55 formed on the other surface of the upper polarizer 51, and an upper adhesive 57 formed on a lower surface of the second upper protection film 55 so as to adhere the antistatic layer 40 and the upper polarizing plate 50 to each other. The upper polarizer 51 is manufactured by dyeing PVA (polyvinyl alcohol) with iodine. Since PVA is very weak in moisture, the first and second upper protection films 53 and 55 are respectively attached to both surfaces of the upper polarizer 51.

The lower polarizing plate 60 is formed on a lower surface of the lower substrate 20. The lower polarizing plate 60 may include a lower polarizer 61 having a predetermined optical axis, a first lower protection film 63 formed on one surface of the lower polarizer 61, a second lower protection film 65 formed on the other surface of the lower polarizer 61, and a lower adhesive 67 formed on an upper surface of the second lower protection film 65 so as to adhere the lower substrate 20 and the lower polarizing plate 60 to each other. In the same manner as the upper polarizer 51, the lower polarizer 61 is also manufactured by dyeing PVA (polyvinyl alcohol) with iodine. In order to overcome the PVA weakness related with moisture, the first and second lower protection films 63 and 65 are respectively attached to both surfaces of the lower polarizer 61.

However, the related art LCD device may have the following disadvantages.

A transmission wavelength for each of the upper polarizer 51 and the lower polarizer 61 may be optimized by complementary-color processes after dyeing PVA with iodine and stretching. However, it is very difficult to control the process of optimizing the transmission wavelength. Also, the upper polarizer 51 and the lower polarizer 61 may shrink due to a restoring force. In addition, a thinness of the LCD device has a limitation due the first and second upper protection films 53 and 55 and the first and second lower protection films 63 and 65.

Also, the antistatic layer 40, which is formed of ITO, may corrode due to the iodine included in the upper polarizer 51.

SUMMARY

Accordingly, embodiments of the present invention are directed to an LCD device and a method of manufacturing the same that substantially obviates one or more problems due to limitations and disadvantages of the related art.

An aspect of embodiments of the present invention is directed to provide an LCD device with a polarizing plate which facilitates to control a manufacturing process, to prevent a problem related with shrinkage, to decrease a thickness of the LCD device, and also to overcome a problem related to corrosion of the antistatic layer.

Additional advantages and features of embodiments of the invention will be set forth in part in the description which follows and in part will become apparent to those having ordinary skill in the art upon examination of the following or may be learned from practice of embodiments of the invention. The objectives and other advantages of embodiments of the invention may be realized and attained by the structure particularly pointed out in the written description and claims hereof as well as the appended drawings.

To achieve these and other advantages and in accordance with the purpose of embodiments of the invention, as embodied and broadly described herein, there is provided an LCD device that may include first and second substrates, a liquid crystal layer between the first and second substrates, and a first polarizing layer on the first substrate, wherein the first polarizing layer includes a plurality of carbon nanotubes aligned in a first direction.

In another aspect of embodiments of the present invention, there is provided a method of manufacturing a liquid crystal display device that may include preparing first and second substrates, forming a first polarizing layer on the first substrate, and bonding the first and second substrates to each other while forming a liquid crystal layer between the first and second substrates, wherein the process of forming the first polarizing layer that may include preparing a carbon nanotube dispersion, coating the carbon nanotube dispersion onto the first substrate, and aligning a plurality of carbon nanotubes in a first direction.

In one embodiment, a liquid crystal display device comprises a first substrate, a second substrate, and a liquid crystal layer between the first substrate and the second substrate. A first polarizing layer is on the first substrate. A conductive element is connected to the first polarizing layer and also grounded to an external case for static removal.

It is to be understood that both the foregoing general description and the following detailed description of embodiments of the present invention are exemplary and explanatory and are intended to provide further explanation of the invention as claimed.

BRIEF DESCRIPTION OF THE DRAWINGS

The accompanying drawings, which are included to provide a further understanding of embodiments of the invention and are incorporated in and constitute a part of this application, illustrate embodiment(s) of the invention and together with the description serve to explain the principle of embodiments of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

During the description of the embodiments of the present invention, the following details about the terms used should be understood.

If a first element is positioned "on or above" a second element, it should be understood that the first and second elements may be brought into direct contact with each other, or a third element may be interposed between the first and second elements.

Also, terms such as "the first" or "the second", do not describe the order of corresponding elements. These terms are simply meant to distinguish between any one element from other elements.

Hereinafter, an LCD device according to the embodiments of the present invention will be described with reference to the accompanying drawings.

Figure 2:
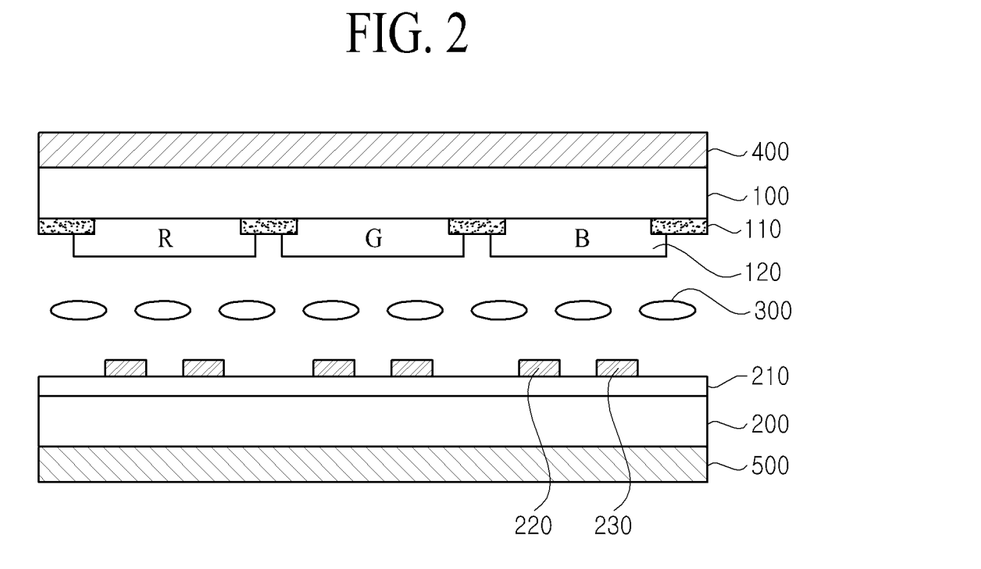
FIG. 2 is a cross sectional view illustrating an LCD device according to one embodiment of the present invention.

FIG. 2 is a cross sectional view illustrating an LCD device according to one embodiment of the present invention.

As shown in FIG. 2, the LCD device according to one embodiment of the present invention may include first and second substrates 100 and 200 overlapping or facing each other, a liquid crystal layer 300 formed between the first and second substrates 100 and 200, a first polarizing layer 400 formed on the first substrate 100, and a second polarizing layer 500 formed on the second substrate 200.

Although not shown, a backlight is provided under the second substrate 200. The light emitted from the backlight passes through the second substrate 200, the liquid crystal layer 300 and the first substrate 100, to thereby display an image. Accordingly, the first substrate 100 corresponds to an upper substrate on which the image is displayed, and the second substrate 200 corresponds to a lower substrate on which the image is not displayed.

On one surface of the first substrate 100, and more particularly, a lower surface of the first substrate 100 which faces the second substrate 200, there are a light shielding layer 110 and a color filter layer 120.

The light shielding layer 110 is provided to prevent the light from leaking in other regions except pixel regions, wherein the light shielding layer 110 is formed in a matrix configuration.

The color filter layer 120 is provided between each pattern of the matrix configuration for the light shielding layer 110, wherein the color filter layer 120 includes red (R), green (G) and blue (B) color filters.

Although not shown, an overcoating layer for planarization of the substrate may be additionally provided on the color filter layer 120.

On one surface of the second substrate 200, and more particularly, an upper surface of the second substrate 200 which faces the first substrate 100, there are a thin film transistor layer 210, a pixel electrode 220 and a common electrode 230.

In the thin film transistor layer 210, although not shown, there are gate and data lines crossing each other to define the pixel region, and a thin film transistor functioning as a switching device at a crossing region of the gate and data lines. A detailed structure of each of the gate line, the data line and the thin film transistor may be changed to various shapes generally known to those in the art.

The pixel electrode 220 and the common electrode 230 are formed on the thin film transistor layer 210. The pixel electrode 220 is electrically connected with the thin film transistor in each of the pixel regions. The common electrode 230 is arranged in parallel to the pixel electrode 220.

Accordingly, a horizontal electric field is generated between the pixel electrode 220 and the common electrode 230, whereby an alignment of the liquid crystal layer 300 is driven by the horizontal electric field, to thereby realize an In-Plane Switching (IPS) LCD device. The pixel electrode 220 and the common electrode 230 may be formed in the same layer, but not necessarily. That is, the pixel electrode 220 and the common electrode 230 may be formed at the different layers. Although not shown, any one of the pixel electrode 220 and the common electrode 230 may be provided with a slit inside and formed on an insulating layer, and the other electrode may be provided in a plate structure and formed under the insulating layer, to thereby realize a Fringe-Field Switching (FFS) LCD device.

According to one embodiment of the present invention, both the pixel electrode 220 and the common electrode 230 are formed on the upper surface of the second substrate 200. As a result, there is a need for removing static electricity from the upper surface of the first substrate 100.

The first polarizing layer 400 is formed on the other surface of the first substrate 100, and more particularly, an upper surface of the first substrate 100 which does not face towards (i.e. faces away from) the second substrate 200.

The first polarizing layer 400 having the predetermined optical axis is formed of a material layer with conductivity. That is, according to the present invention, the first polarizing layer 400 serves a polarizing function and a static-electricity prevention function. Accordingly, there is no additional need for the antistatic layer of the related art on the upper surface of the first substrate 100.

The first polarizing layer 400 serving the above functions may include carbon nanotubes.

Figure 3:
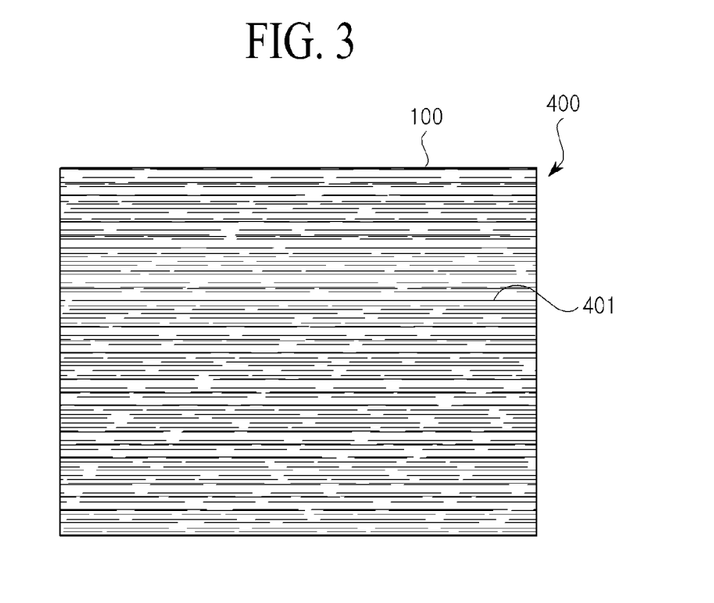
FIG. 3 is a plane view illustrating a first polarizing layer according to one embodiment of the present invention.

FIG. 3 is a plane view illustrating the first polarizing layer 400 according to one embodiment of the present invention.

As shown in FIG. 3, the first polarizing layer 400 according to one embodiment of the present invention may include the plurality of carbon nanotubes 401 on the upper surface of the first substrate 100.

The carbon nanotube 401 is obtained by round rolling a graphite layer of a plate shape. According to the shape of graphite layer, the carbon nanotube 401 may have properties of a conductor such as metal. Thus, if the plurality of carbon nanotubes 401 are densely concentrated on the first substrate 100, they may function as an antistatic layer (static-electricity prevention layer).

The carbon nanotube 401 generally has better properties than ITO. In detail, electric conductivity of the carbon nanotube 401 is higher than that of ITO, and as a result the carbon nanotube 401 enables a stable electricity flow. While a sheet resistance value of ITO is $1 \times 10^2$ ($\Omega/cm2$), a sheet resistance value of carbon nanotube is $10^{-4} \sim 10^{-5}$ ($\Omega/cm2$), that is, the sheet resistance value of carbon nanotube 401 is lower than the sheet resistance value of ITO. In addition, the carbon nanotube 401 is stronger than steel. Also the carbon nanotube 401 has good elasticity and is more flexible than ITO or inorganic material. Accordingly, as compared with ITO, the carbon nanotube 401 may be more readily applied to a flexible LCD device.

The carbon nanotube 401 which is applicable to the present invention may be various kinds of carbon nanotube having high conductivity, for example, SWNT (Single-walled Carbon Nanotube), DWNT (Double-walled Carbon Nanotube), MWNT (Muti-walled Carbon Nanotube), or Rope NT (Rope Carbon Nanotube).

Also, the carbon nanotubes 401 have properties of absorbing light components which are incident in its alignment direction. Thus, if the carbon nanotubes 401 are aligned in a constant direction, the carbon nanotubes 401 may function as a polarizer. For example, as shown in FIG. 3, if the plurality of carbon nanotubes 401 are aligned in a first direction, and more particularly, a horizontal direction, light components vibrating in the horizontal direction are absorbed in the carbon nanotubes 401, and light components vibrating in a vertical direction pass through the carbon nanotubes 401. That is, the carbon nanotubes 401 may function as the polarizer of the LCD device according to the present invention.

According to one embodiment of the present invention, the first polarizing layer 400 including the plurality of carbon nanotubes 401 aligned in the direction is applied to the LCD device so that the additional antistatic layer is unnecessary. Compared with the related art, it is simpler and easier to manufacture and maintain the first polarizing layer 400, and furthermore it is possible to decrease the thickness of the LCD device. As will be seen from the following manufacturing process to be described, unlike the related art, there is no need for to perform a stretching process on the polarizing layer 400 as there is no shrinkage of the first polarizing layer 400.

Referring once again to FIG. 2, the second polarizing layer 500 is formed on the other surface of the second substrate 200, and more particularly, a lower surface of the second substrate 200 which does not face towards the first substrate 100.

The second polarizing layer 500 has an optical axis which is different from the optical axis of the first polarizing layer 400. Unlike the first polarizing layer 400, it is unnecessary to provide the second polarizing layer 500 of conductive material layer. Accordingly, the second polarizing layer 500 may be formed of a polarizing plate, above as the related art. That is, the second polarizing layer 500 may include a polarizer having a predetermined optical axis, lower and upper protection films respectively formed on lower and upper surfaces of the polarizer, and an adhesive formed on an upper surface of the upper protection film. In this case, the polarizer may be manufactured by dyeing PVA (polyvinyl alcohol) with iodine.

However, it is not limited to the above structure. In a similar way to the first polarizing layer 400, the second polarizing layer 500 may include a plurality of carbon nanotubes. In this case, the plurality of carbon nanotubes included in the second polarizing layer 500 may be aligned in a direction being perpendicular to that of the carbon nanotubes included in the first polarizing layer 400.

The first polarizing layer 400 which functions as the aforementioned antistatic layer may be grounded as described with reference to FIGS. 4A and 4B.

Figure 4A:
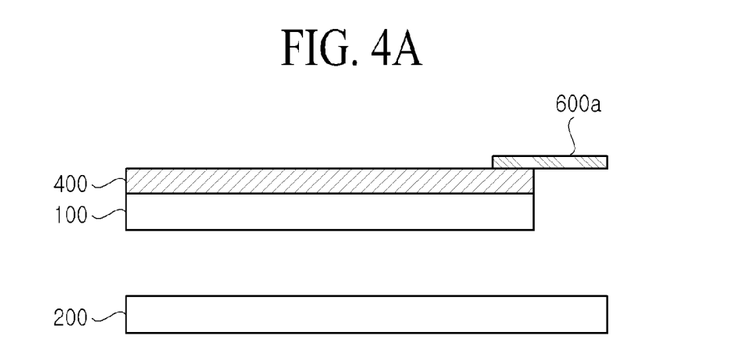
FIGS. 4A and 4B are cross sectional views illustrating a method for grounding the first polarizing layer according to various embodiments of the present invention.
Figure 4B:
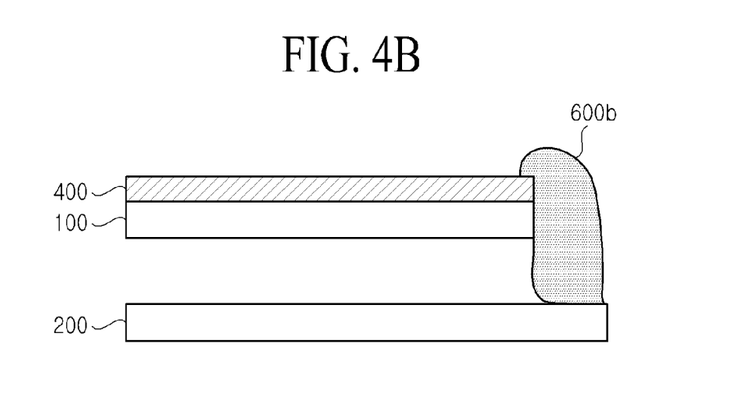

FIGS. 4A and 4B are cross sectional views illustrating a method of grounding the first polarizing layer according to various embodiments of the present invention.

As shown in FIG. 4A, after connecting a ground tape 600a with the first polarizing layer 400, the ground tape 600a may be grounded to an external case (not shown).

As shown in FIG. 4B, after connecting a silver (Ag) dot 600b with the first polarizing layer 400, the silver (Ag) dot 600b may be grounded to an external case (not shown). Both the ground tape 600a and silver dot 600b are examples of electrically conductive elements that provide a static removal path from the first polarizing layer 400 to ground.

Figure 5:
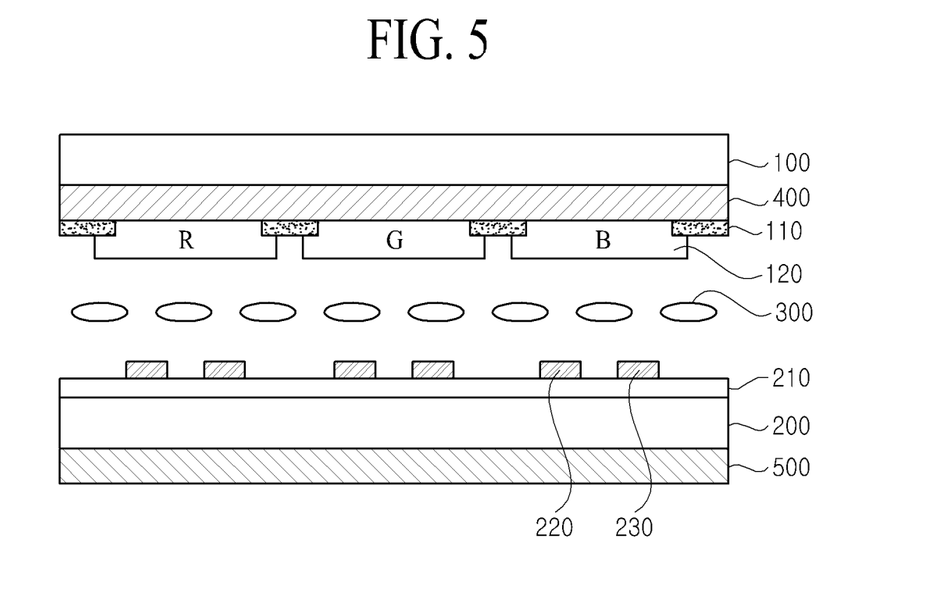
FIG. 5 is a cross sectional view illustrating an LCD device according to another embodiment of the present invention.

FIG. 5 is a cross sectional view illustrating an LCD device according to another embodiment of the present invention. Except for a change in position of a first polarizing layer 400, the LCD device of FIG. 5 is identical in structure to the above LCD device of FIG. 2. Accordingly, wherever possible, the same reference numbers will be used throughout the drawings to refer to the same or like parts, and a detailed description for the same parts will be omitted.

In the LCD device shown in FIG. 2, the first polarizing layer 400 is formed on the upper surface of the first substrate 100 which does not face towards the second substrate 200.

However, in case of the LCD device shown in FIG. 5, the first polarizing layer 400 is formed on a lower surface of a first substrate 100 facing towards a second substrate 200. In more detail, the first polarizing layer 400 is formed between the first substrate 100 and a light shielding layer 110, and between the first substrate 100 and a color filter layer 120.

If the first polarizing layer 400 is formed on the lower surface of the first substrate 100, as shown in FIG. 5, a ground tape (not shown) is attached to the first polarizing layer 400, and the ground tape is extended outside a sealant (not shown) for bonding both substrates 100 and 200 and is then grounded to an external case (not shown).

Figure 6:
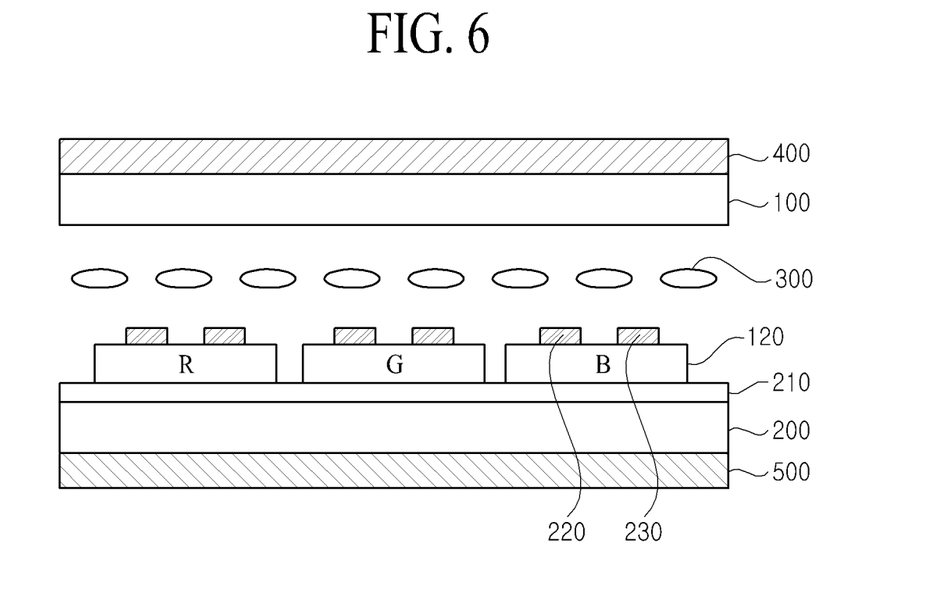
FIG. 6 is a cross sectional view illustrating an LCD device according to another embodiment of the present invention.

FIG. 6 is a cross sectional view illustrating an LCD device according to another embodiment of the present invention, which relates to a COT (Color on TFT) structure in which a color filter layer 120 is formed on a thin film transistor layer 210.

In case of the COT structure shown in FIG. 6, only first polarizing layer 400 is formed on a first substrate 100, whereby the first substrate 100 is simplified in its structure and manufacturing process.

In a detailed description for the LCD device of FIG. 6, the first polarizing layer 400 is formed on an upper surface of the first substrate 100. In the same manner as the above embodiment, the first polarizing layer 400 may include a plurality of carbon nanotubes aligned in a first direction. Alternatively, the first polarizing layer 400 may be formed on a lower surface of the first substrate 100.

On an upper surface of a second substrate 200 facing towards the first substrate 100, there are a thin film transistor layer 210, a color filter layer 120 on the thin film transistor layer 210, and pixel and common electrodes 220 and 230 on the color filter layer 120. Also, a second polarizing layer 500 is formed on the lower surface of the first substrate 100. Then, a liquid crystal layer 300 is formed between the first substrate 100 and the second substrate 200.

FIGS. 7A to 7D are cross sectional views illustrating a method of manufacturing the LCD device according to one embodiment of the present invention, which relate to the method of manufacturing the LCD device shown in FIG. 2.

Figure 7A:
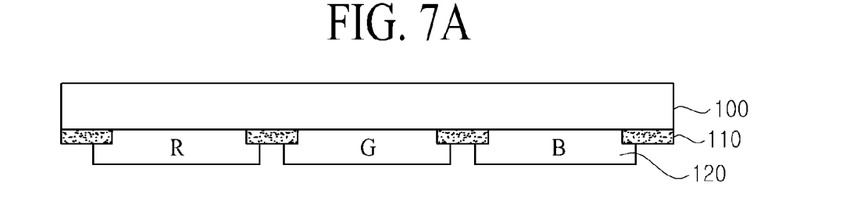
FIGS. 7A to 7D are cross sectional views illustrating a method of manufacturing the LCD device according to one embodiment of the present invention.

First, as shown in FIG. 7A, the light shielding layer 110 is formed in the matrix configuration on the lower surface of the first substrate 100, and the color filter layer 120 is formed between each pattern of the matrix configuration of the light shielding layer 110.

Figure 7B:
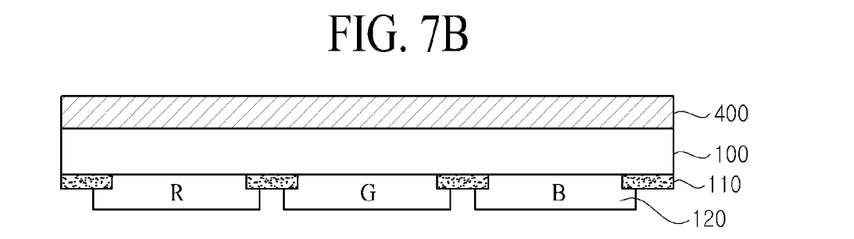

Then, as shown in FIG. 7B, the first polarizing layer 400 is formed on the upper surface of the first substrate 100. A method of forming the first polarizing layer 400 will be described in detail with reference to FIGS. 8A to 8C.

Figure 8A:
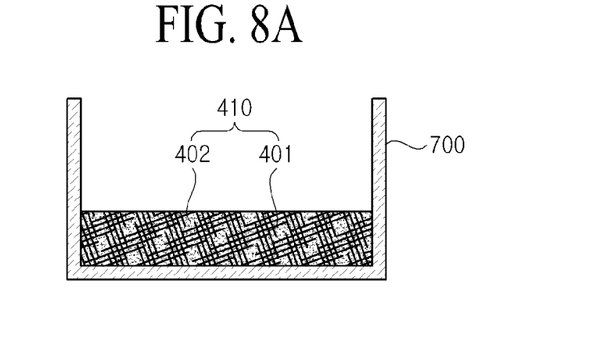
FIGS. 8A to 8C illustrate a method of forming the first polarizing layer according to one embodiment of the present invention.

As shown in FIG. 8A, a carbon nanotube dispersion 410 is prepared. The carbon nanotube dispersion 410 may be prepared by filling a container 700 with fluid 402, supplying the plurality of carbon nanotubes 401 to the container 700 filled with fluid 402, and dispersing the carbon nanotubes 401. The carbon nanotubes bond together so that it is necessary to carry out the process of mixing the fluid 402 and uniformly dispersing the plurality of carbon nanotubes inside the fluid 402.

The fluid 402 may use at least one selected from a group including Polyvinyl alcohol (PVA), Gelatin, Dichloroethene (DCE), Dimethylformamide (DMF) and Trade name Triton X-100 of nonionic surfactant, but not limited to these materials.

Preferably, the carbon nanotubes 401 are included within a range of 1% by weight to 50% by weight in the entire carbon nanotube dispersion 410. If the carbon nanotubes 401 are less than 1% by weight, both polarizing and antistatic functions may be deteriorated. Meanwhile, if the carbon nanotubes 401 are more than 50% by weight, the carbon nanotubes 401 may be bonded together, which causes difficulties in alignment process.

In order to realize smooth dispersion and alignment of the carbon nanotubes 401, it is preferable that a length of carbon nanotube 401 be not more than 200αm, but not limited to this length. Also, in order to enhance a degree of dispersion of the carbon nanotubes 401 degree, it is possible to apply a functional group to the surface of carbon nanotube 401.

The process of dispersing the carbon nanotubes 401 in the fluid 402 may be carried out by ultrasonic treatment or an ultracentrifugation process.

Figure 8B:
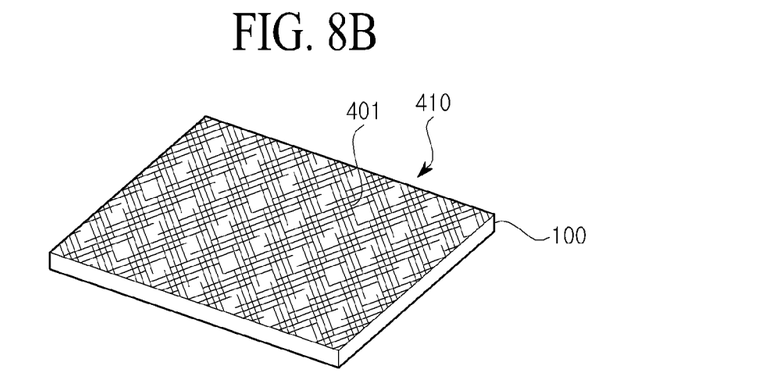

After that, as shown in FIG. 8B, the carbon nanotube dispersion 410 is coated onto the upper surface of the first substrate 100. After the coating process, the carbon nanotube dispersion 410 is dried to remove the fluid 402.

Figure 8C:
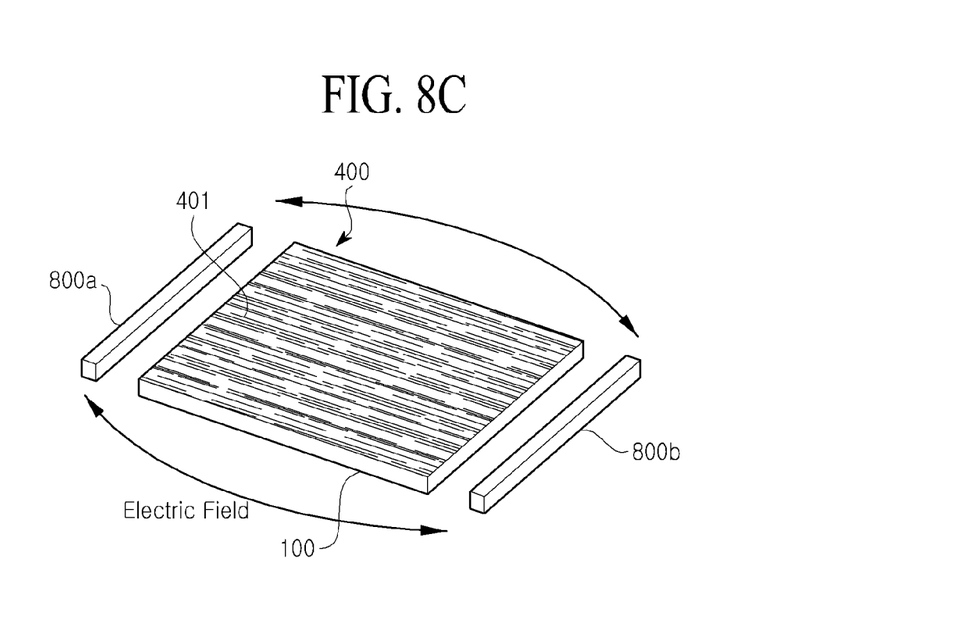

Then, as shown in FIG. 8C, an electric field is formed by one pair of electrodes 800a and 800b, whereby the plurality of carbon nanotubes 401 are aligned in the first direction, thereby forming the first polarizing layer 400 including the plurality of carbon nanotubes 401 aligned in the first direction.

Figure 7C:
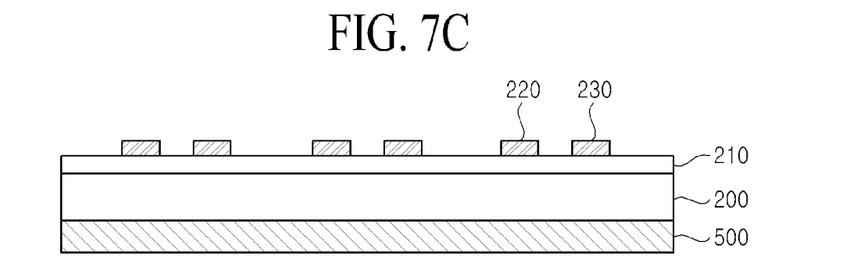

As shown in FIG. 7C, the thin film transistor layer 210 is formed on the upper surface of the second substrate 200, and the pixel and common electrodes 220 and 230 are formed on the thin film transistor layer 210.

Also, the second polarizing layer 500 is formed on the lower surface of the second substrate 200. According to the above method described with reference to FIGS. 8A to 8C, the second polarizing layer 500 may be formed by aligning the plurality of carbon nanotubes in the second direction, but not necessarily. The second polarizing layer 500 may include the polarizer, the lower and upper protection films respectively formed on the lower and upper surfaces of the polarizer, and the adhesive formed on the upper surface of the upper protection film. The second polarizing layer 500 may be attached to the lower surface of the second substrate 200. In this case, the second polarizing layer 500 may be attached after bonding the first and second substrates 100 and 200 to each other.

Figure 7D:
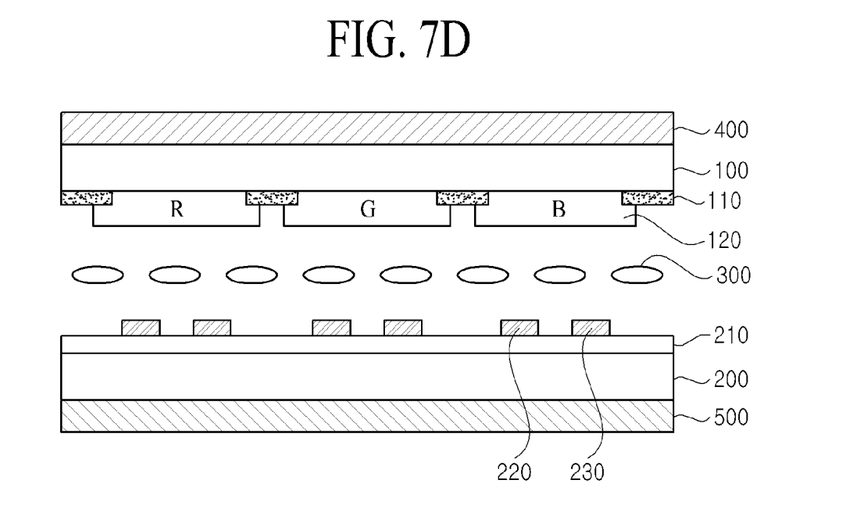

As shown in FIG. 7D, while the liquid crystal layer 300 is formed between the first substrate 100 and the second substrate 200, the first and second substrates 100 and 200 are bonded to each other.

This process may be carried out by bonding the first and second substrates 100 and 200 to each other through the use of sealant and injecting liquid crystal via an injection hole provided in the sealant. In another way, this process may be carried out by dispensing liquid crystal onto any one of the first and second substrates 100 and 200 and bonding the first and second substrates 100 and 200 to each other through the use of sealant.

Although not shown, the method of manufacturing the LCD device shown in FIGS. 5 and 6 may include the process of forming the first polarizing layer 400 on the lower or upper surface of the first substrate 100 in accordance with the above method described with reference to FIGS. 8A to 8C, and the process of forming the other elements included in the LCD device may use the various methods generally known to those in the art.

According to one embodiment of the present invention, the first polarizing layer 400 including the plurality of carbon nanotubes 401 arranged in the first direction is formed on the first substrate 100 so that the additional antistatic layer is unnecessary. Also, unlike the related art, there is no need for to perform a stretching process on the polarizing layer 400 as there is no shrinkage of the first polarizing layer 400. In addition, as compared with the related art, it is simple and easy to manufacture and maintain the first polarizing layer 400, and furthermore it is possible to make the LCD device thinner.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device comprising:
   a first substrate;
   a second substrate;
   a liquid crystal layer between the first substrate and the second substrate; and
   a first antistatic polarizing layer on the first substrate, the first antistatic polarizing layer including a plurality of first carbon nanotubes aligned in a first direction, and the plurality of first carbon nanotubes both polarize light and have an antistatic function in the first antistatic polarizing layer.

2. The liquid crystal display device according to claim 1, wherein the first polarizing layer is on a surface of the first substrate which does not face towards the second substrate.

3. The liquid crystal display device according to claim 1, wherein the first polarizing layer is on a surface of the first substrate which faces towards the second substrate.

4. The liquid crystal display device according to claim 1, further comprising:
   a ground tape connected to the first polarizing layer and also grounded to an external case.

5. The liquid crystal display device according to claim 1, further comprising:
   a silver (Ag) dot connected to the first polarizing layer and also grounded to an external case.

6. The liquid crystal display device according to claim 1, further comprising:
   a second polarizing layer on the second substrate, the second polarizing layer including a plurality of second carbon nanotubes aligned in a second direction.

7. A liquid crystal display device comprising:
   a first substrate;
   a second substrate;
   a liquid crystal layer between the first substrate and the second substrate;
   a first antistatic polarizing layer on the first substrate, the first antistatic polarizing layer including a plurality of first carbon nanotubes aligned in a first direction, and the plurality of first carbon nanotubes both polarize light and have an antistatic function in the first antistatic polarizing layer; and
   a conductive element connected to the first polarizing layer and also grounded to an external case for static removal.

8. The display device of claim 7, wherein the conductive element is a ground strap.

9. The display device of claim 7, wherein the conductive element is a silver dot.

10. The display device of claim 7, further comprising a second polarizing layer on the second substrate, the second polarizing layer comprising second carbon nanotubes aligned in a second direction.

* * * * *